(12) United States Patent
Guo et al.

(10) Patent No.: US 10,886,310 B2
(45) Date of Patent: Jan. 5, 2021

(54) PHOTOELECTRIC SENSOR, FABRICATING METHOD THEREOF AND DISPLAY DEVICE

(71) Applicant: BOE TECHNOLOGY GROUP CO., LTD., Beijing (CN)

(72) Inventors: Yuzhen Guo, Beijing (CN); Xue Dong, Beijing (CN); Haisheng Wang, Beijing (CN); Chunwei Wu, Beijing (CN); Yingming Liu, Beijing (CN); Rui Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/327,892

(22) PCT Filed: May 17, 2018

(86) PCT No.: PCT/CN2018/087253
§ 371 (c)(1),
(2) Date: Feb. 25, 2019

(87) PCT Pub. No.: WO2018/214799
PCT Pub. Date: Nov. 29, 2018

(65) Prior Publication Data
US 2019/0198543 A1 Jun. 27, 2019

(30) Foreign Application Priority Data
May 26, 2017 (CN) .......................... 2017 1 0383647

(51) Int. Cl.
*H01L 27/146* (2006.01)
*G06F 21/32* (2013.01)

(52) U.S. Cl.
CPC ........ *H01L 27/14612* (2013.01); *G06F 21/32* (2013.01); *H01L 27/14621* (2013.01);
(Continued)

(58) Field of Classification Search
CPC .......... H01L 25/0753; H01L 27/14663; H01L 33/62
(Continued)

(56) References Cited

U.S. PATENT DOCUMENTS

| | | | |
|---|---|---|---|
| 2005/0233493 A1* | 10/2005 | Augusto | ................ G02B 1/005 |
| | | | 438/51 |
| 2006/0001120 A1 | 1/2006 | Wright | |

(Continued)

FOREIGN PATENT DOCUMENTS

| | | |
|---|---|---|
| CN | 1536419 A | 10/2004 |
| CN | 1723572 A | 1/2006 |

(Continued)

OTHER PUBLICATIONS $2^{nd}$ Chinese Office Action, English Translation.
(Continued)

*Primary Examiner* — Jonathan Han
(74) *Attorney, Agent, or Firm* — Brooks Kushman P.C.

(57) ABSTRACT

The application discloses a photoelectric sensor, a fabricating method thereof, and a display device. The method for fabricating the photoelectric sensor, includes: fabricating a thin film transistor (TFT) array and a photodiode array on a silicon substrate; transferring the TFT array onto a base substrate by a micro transfer process; and placing the photodiode array on the base substrate formed with the TFT array, in a manner that an orthographic projection of the photodiode array on the base substrate overlaps with an orthographic projection of the TFT array on the base substrate.

16 Claims, 5 Drawing Sheets

(52) U.S. Cl.
CPC .. *H01L 27/14636* (2013.01); *H01L 27/14647* (2013.01); *H01L 27/14665* (2013.01); *H01L 27/14683* (2013.01); *H01L 27/14678* (2013.01)

(58) Field of Classification Search
USPC .................................. 257/292; 438/455, 51
See application file for complete search history.

(56) References Cited

U.S. PATENT DOCUMENTS

| 2014/0077212 | A1 | 3/2014 | Li et al. | |
|---|---|---|---|---|
| 2016/0233283 | A1* | 8/2016 | Kim | H01L 27/3269 |
| 2016/0290602 | A1* | 10/2016 | Chang | G02B 6/009 |
| 2017/0048976 | A1* | 2/2017 | Prevatte | H05K 3/3436 |

FOREIGN PATENT DOCUMENTS

| CN | 1321347 | C | 6/2007 |
|---|---|---|---|
| CN | 1983649 | A | 6/2007 |
| CN | 101427387 | A | 5/2009 |
| CN | 101681695 | A | 3/2010 |
| CN | 102790061 | A | 11/2012 |
| CN | 103713778 | A | 4/2014 |
| CN | 106709455 | A | 5/2017 |
| CN | 107248518 | A | 10/2017 |
| KR | 20090046179 | A | 5/2009 |
| KR | 20110134226 | A | 12/2011 |

OTHER PUBLICATIONS

CN1723572A, English Abstract and U.S. Equivalent U.S. Pub. No. 2005/0233493.
CN106709455A, English Abstract and Machine Translation.
First Office Action for Chinese Application No. 201710383647.0, dated Jun. 14, 2019, 10 Pages.
International Search Report and Written Opinion for Application No. PCT/CN2018/087253, dated Jul. 27, 2018, 10 Pages.
Second Office Action for Chinese Application No. 201710383647.0, dated Nov. 29, 2019, 8 Pages.

* cited by examiner

PHOTOELECTRIC SENSOR, FABRICATING METHOD THEREOF AND DISPLAY DEVICE

CROSS-REFERENCE TO RELATED APPLICATIONS

This application is the U.S. national phase of PCT Application No. PCT/CN2018/087253 filed on May 17, 2018, which claims priority to Chinese Patent Application No. 201710383647.0 filed on May 26, 2017, which are incorporated herein by reference in their entireties.

TECHNICAL FIELD

The application relates to display technologies, and more particularly, to a photoelectric sensor, a fabricating method thereof, and a display device.

BACKGROUND

Photoelectric sensors have the advantages of high precision, fast response, non-contact, more measurable parameters and simple structure. They are widely used in applications of detection and control. For example, photoelectric sensors can be applied to soot turbidity monitor, barcode scanning pen, product counter, photoelectric smoke alarm, rotational speed measuring instrument, laser weapon, and the like.

The photoelectric sensor includes an array substrate, which further includes a thin film transistor (TFT) and a photodiode (PIN). The PIN receives light, converts an optical signal into an electrical signal through a photovoltaic effect, controls storage and read of the electrical signal by turning off and turning on the TFT, so as to achieve detection or control functions.

However, the PIN and the TFT are both disposed in the same layer, and the ratio of the area occupied by the PIN is the aperture ratio of the photoelectric sensor, so that the aperture ratio of the photoelectric sensor cannot reach 100%, and there is a difficulty in increasing the resolution of the photoelectric sensor. After producing the TFT, if the PIN is stacked over such TFT, the aperture ratio of the photoelectric sensor can be increased to 100%, which will significantly improve the resolution of the photoelectric sensor. However, when a PIN is stacked on top of a TFT, doping modification of the photosensitive layer is required, and the doping process affects the active layer of the lower TFT, which interferes with the performance of the TFT.

SUMMARY

From one aspect, an embodiment of the application provides a method for fabricating a photoelectric sensor, including: fabricating a thin film transistor (TFT) array and a photodiode array on a silicon substrate; transferring the TFT array onto a base substrate by a micro transfer process; and placing the photodiode array on the base substrate formed with the TFT array, in a manner that an orthographic projection of the photodiode array on the base substrate overlaps with an orthographic projection of the TFT array on the base substrate.

Optically, fabricating the TFT array and the photodiode array on the silicon substrate includes: fabricating the TFT array on a first silicon substrate and fabricating the photodiode array on a second silicon substrate; wherein transferring the TFT array onto the base substrate by the micro transfer process includes: stripping the TFT array from the first silicon substrate, by the micro transfer process; placing the TFT array on the base substrate formed with an electrical signal lead; and, electrically connecting the TFT array and the electrical signal lead; wherein placing the photodiode array on the base substrate formed with the TFT array, in a manner that the orthographic projection of the photodiode array on the base substrate overlaps with the orthographic projection of the TFT array on the base substrate include: stripping the photodiode array from the second silicon substrate, placing the photodiode array on the base substrate formed with the TFT array, in a manner that the orthographic projection of the photodiode array on the base substrate overlaps with the orthographic projection of the TFT array on the base substrate, and electrically connecting the TFT array and the photodiode array.

Optionally, electrically connecting the TFT array and the electrical signal lead, and electrically connecting the TFT array and the photodiode array include: after placing the TFT array on the base substrate formed with the electrical signal lead, forming a first via hole exposing the electrical signal lead, a second via hole exposing a source of the TFT array, and a third via hole exposing a drain of the TFT array; forming a first conductive connection line, which connects the source and the electrical signal lead through the first via hole and the second via hole, and forming a second conductive connection line, which connects to the drain through the third via hole; after placing the photodiode array on the base substrate formed with the TFT array, contacting an electrode of the photodiode array with the second conductive connection line.

Optionally, the method further includes: before stripping the TFT array from the first silicon substrate by the micro transfer process, and placing the TFT array on the base substrate formed with the electrical signal lead, preparing a first bonding layer on the base substrate formed with the electrical signal lead; wherein stripping the TFT array from the first silicon substrate by the micro transfer process, and placing the TFT array on the base substrate formed with the electrical signal lead include: adsorbing the TFT array stripped from the first silicon substrate, by using a micro-transfer stamp; contacting the TFT array adsorbed on the micro-transfer stamp with the first bonding layer, such that the TFT array is adhered to the first bonding layer.

Optionally, the method further includes: before stripping the photodiode array from the second silicon substrate by the micro transfer process, and placing the photodiode array on the base substrate formed with the TFT array, in a manner that the orthographic projection of the photodiode array on the base substrate overlaps with the orthographic projection of the TFT array on the base substrate, preparing a second bonding layer on the base substrate formed with the TFT array; wherein stripping the photodiode array from the second silicon substrate by the micro transfer process, and placing the photodiode array on the base substrate formed with the TFT array, in a manner that the orthographic projection of the photodiode array on the base substrate overlaps with the orthographic projection of the TFT array on the base substrate include: adsorbing the photodiode array stripped from the second silicon substrate, by using a micro-transfer stamp; and, contacting the photodiode array adsorbed on the micro-transfer stamp with the second bonding layer, in a manner that the orthographic projection of the photodiode array on the base substrate overlaps with the orthographic projection of the TFT array on the base substrate, such that the photodiode array is adhered to the second bonding layer.

Optionally, transferring the TFT array onto the base substrate by the micro transfer process includes: transferring the TFT array onto a glass base substrate by the micro transfer process.

From another aspect, an embodiment of the application provides a photoelectric sensor, including: a base substrate; an electrical signal lead in the base substrate; a first bonding layer; a TFT array on the first bonding layer, wherein the TFT array electrically connects the electrical signal lead through a via hole penetrating the first bonding layer; a second bonding layer; a photodiode array on the second bonding layer, wherein the photodiode array electrically connects the TFT array through a via hole penetrating the second bonding layer, an orthographic projection of the photodiode array on the base substrate overlaps with an orthographic projection of the TFT array on the base substrate.

Optionally, the orthographic projection of the TFT array on the base substrate falls within the orthographic projection of the photodiode array on the base substrate.

Optionally, the base substrate is a glass base substrate.

Optionally, the first bonding layer covers the electrical signal lead and the base substrate.

Optionally, the photoelectric sensor further includes a first micro-transfer protective layer, wherein the second bonding layer covers the first micro-transfer protective layer.

Optionally, the photoelectric sensor further includes a second micro-transfer protective layer, which covers the photodiode array.

From another aspect, an embodiment of the application provides a display device, including a stacked display screen, and foregoing photoelectric sensor, wherein the photoelectric sensor is located on a non-display side of the display screen, and the display screen includes a light transmission hole with a diameter less than a first value.

Optionally, the light transmission hole is a gap between TFTs on an array base substrate of the display screen; or, the light transmission holes are arranged on a black matrix of a color film substrate of the display screen.

Optionally, the first value is 10 um.

DETAILED DESCRIPTION

To make technical problems, technical solutions and advantages of embodiments of the application more clear, detailed descriptions about attached figures and specific embodiments will be provided in the following.

Figure 1:
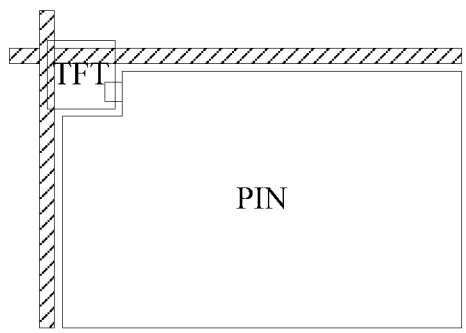
FIG. 1 is a schematic diagram illustrating the same layer arrangement of a PIN and a TFT.

As shown in FIG. 1, no matter a photoelectric sensor is made by a glass substrate or a silicon substrate, a PIN and a TFT are disposed in the same layer, and the ratio of the area occupied by the PIN is the aperture ratio of the photoelectric sensor. Subsequently, the aperture ratio of the photoelectric sensor cannot reach 100%, which makes it difficult to increase the resolution of the photoelectric sensor.

Figure 2:
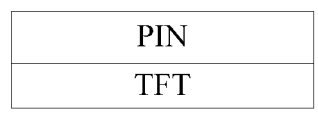
FIG. 2 is a schematic diagram illustrating a stacking arrangement of a PIN and a TFT.

As shown in FIG. 2, after producing the TFT, if a PIN is stacked over the TFT, the aperture ratio of the photoelectric sensor may be increased to 100%, which will significantly improve the resolution of the photoelectric sensor. However, when the PIN is stacked on top of the TFT, doping modification of the photosensitive layer is required, and the doping process affects the active layer of the lower TFT, which interferes with the performance of the TFT.

To address the foregoing problem, an embodiment of the application provides a photoelectric sensor, a fabricating method thereof, and a display device, which may improve the imaging quality and aperture ratio of a photoelectric sensor.

An embodiment of the application provides a method for fabricating a photoelectric sensor, including: fabricating a TFT array and a PIN array on a silicon substrate; and transferring the TFT array and the PIN array onto a base substrate by a micro-transfer process.

In this embodiment, a TFT array and a PIN array are firstly fabricated on a silicon substrate, and then the fabricated TFT array and PIN array are stripped from the silicon substrate. The TFT array and the PIN array are placed on a base substrate, such as a glass substrate, by a micro transfer process, so as to fabricate a photoelectric sensor. In the silicon-based process, the fabricated TFT and PIN possess good device performance, which may solve the problem of poor switching performance of glass-substrate-fabricated TFT and poor photoelectric characteristics of glass-substrate-fabricated PIN.

In a specific embodiment, the fabricating method includes: respectively fabricating a TFT array and a PIN array on a different silicon substrate; stripping the fabricated TFT array from the silicon substrate by a micro transfer process, placing the TFT array on the base substrate on which an electrical signal lead is formed, electrically connecting the TFT array and the electrical signal lead; and, stripping the fabricated PIN array from the silicon substrate by the micro transfer process, placing the PIN array on the base substrate on which the TFT array is formed, electrically connecting the TFT array and the PIN array.

Furthermore, an orthographic projection of the PIN array on the base substrate overlaps with an orthographic projection of the TFT array on the base substrate.

Optionally, the orthographic projection of the TFT array on the base substrate completely falls within the orthographic projection of the PIN array on the base substrate, subsequently, the aperture ratio of the photoelectric sensor can reach 100%, and the resolution of the photoelectric sensor is significantly improved.

Furthermore, electrically connecting the TFT array and the electrical signal lead, and electrically connecting the TFT array and the PIN array include: after placing the TFT array on the base substrate on which the electrical signal lead is formed, forming a first via hole exposing the electrical signal lead, a second via hole exposing a source of the TFT array, and a third via hole exposing a drain of the TFT array; forming a first conductive connection line, which connects the source with the electrical signal lead through the first via hole and the second via hole, forming a second conductive connection line connecting the drain through the third via hole; and, placing the PIN array on the base substrate on which the TFT array is formed, enabling an electrode of the PIN array to contact with the second conductive connection line Furthermore, before striping the fabricated TFT array from the silicon substrate by the micro transfer process, and placing the TFT array on the base substrate on which the electrical signal lead is formed, the method further includes: fabricating a first bonding layer on the base substrate formed with the electrical signal lead; stripping the fabricated TFT array from the silicon substrate by a micro transfer process, and placing the TFT array on the base substrate on which the electrical signal lead is formed, which include:

adsorbing the TFT array stripped off from the silicon substrate using a micro-transfer stamp; and, contacting the TFT array adsorbed on the micro-transfer stamp with the first bonding layer, such that the TFT array is adhered to the first bonding layer, and transferring the TFT array to the base substrate by using adhesion of the first bonding layer.

Furthermore, before stripping the fabricated PIN array from the silicon substrate by a micro-transfer process, and placing the PIN array on the base substrate on which the TFT array is formed, the method further includes:

fabricating a second bonding layer on the base substrate formed with the TFT array;

stripping the fabricated PIN array from the silicon substrate by a micro-transfer process, and placing the PIN array on the base substrate formed with the TFT array, which include:

adsorbing the PIN array stripped from the silicon substrate by a micro-transfer stamp; and, contacting the PIN array adsorbed on the micro-transfer stamp with the second bonding layer, enabling the PIN array to adhere to the second bonding layer, and transferring the PIN array to the base substrate by using adhesion of the second bonding layer.

Figure 3:
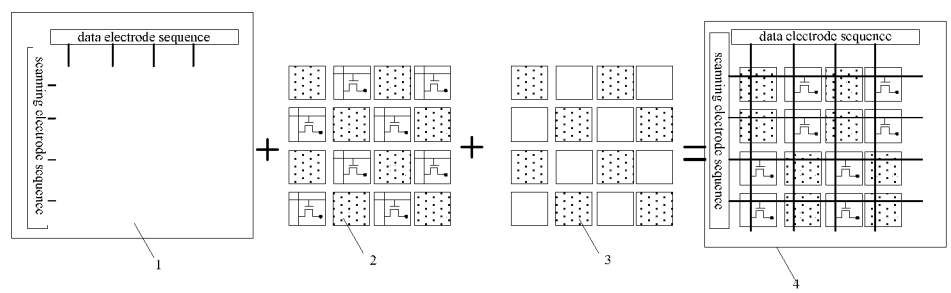
FIG. 3 is a schematic diagram illustrating how to produce a photoelectric sensor, in accordance with a specific embodiment of the application.

FIG. 3 is a flow chart illustrating how to fabricate a photoelectric sensor, in accordance with a specific embodiment of the application. In the embodiment, before performing a micro transfer, an electrical signal lead is prepared on the surface of the glass substrate 1, by using a glass substrate related process. On the silicon substrate of the micro transfer process, a TFT, a PIN or a pixel modulation circuit is prepared by a silicon-based fabrication process, and then the TFT and the PIN are respectively stripped off from the wafer surface, by using a micro-transfer stamp. In FIG. 3, reference numeral 2 indicates to carry a micro-transfer stamp of a TFT array. In FIG. 3, reference numeral 2 indicates to carry a micro-transfer stamp of a PIN array. Subsequently, the TFT array and the PIN array are stacked in a suitable position on the surface of the glass substrate 1, and a photoelectric sensor 4 is obtained.

Figure 4:
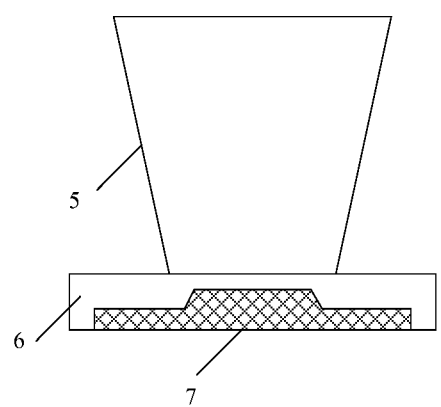
FIG. 4 is a schematic diagram illustrating a micro-transfer stamp with a TFT.
Figure 5:
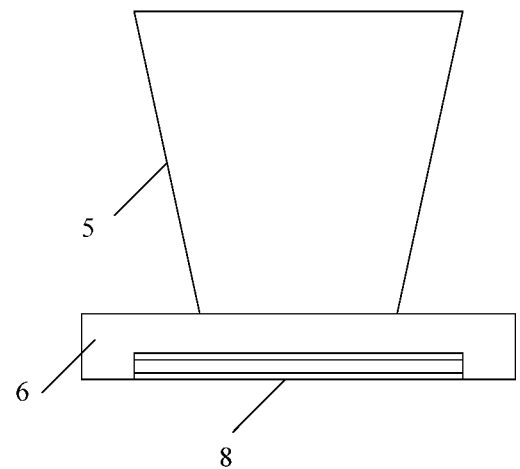
FIG. 5 is a schematic diagram illustrating a micro-transfer stamp with a PIN.

FIG. 4 is a schematic diagram illustrating to carry a micro-transfer stamp 5 of a TFT 7. FIG. 5 is a schematic diagram illustrating to carry a micro-transfer stamp 5 of a PIN 8. As shown in FIG. 4 and FIG. 5, during the micro-transfer process, in order to ensure an adhesion transfer of the micro-transfer stamp 5, the TFT and the PIN, a micro-transfer protective layer 6 is added. The van der Waals force of the micro-transfer protective layer 6 and the micro-transfer stamp 5 provides appropriate grip for the transfer of TFT and PIN.

Figure 6:
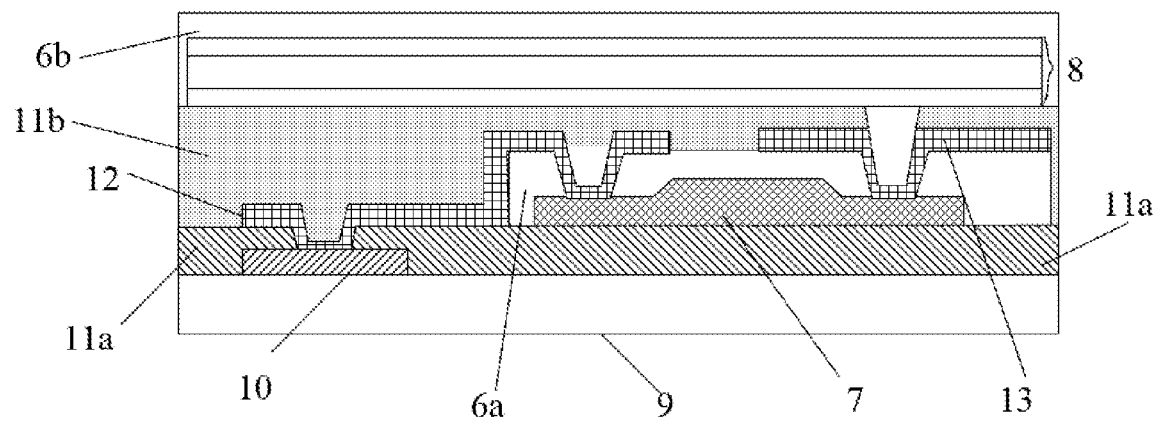
FIG. 6 is a schematic diagram illustrating a stacking arrangement of a TFT and a PIN in a photoelectric sensor, in accordance with an embodiment of the application.
Figure 7:
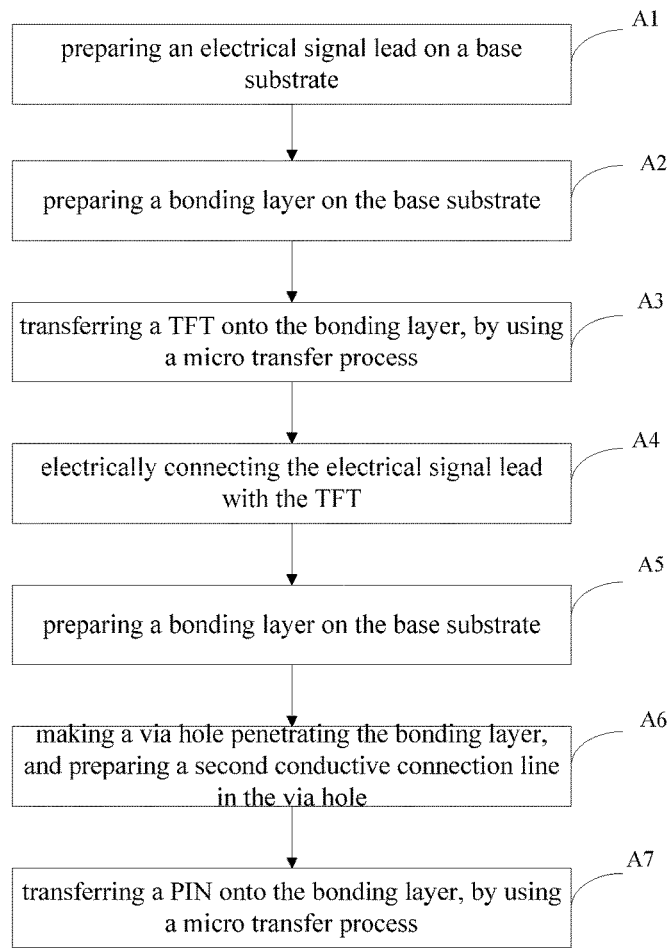
FIG. 7 is a flowchart illustrating how to produce a photoelectric sensor, in accordance with a specific embodiment of the application.

As shown in FIG. 6 and FIG. 7, in the embodiment, the method for fabricating the photoelectric sensor includes the following blocks:

A1, preparing an electrical signal lead 10 on a base substrate 9;

A2, preparing a bonding layer 11a on the base substrate 9;

before transferring the TFT to the surface of base substrate 9, in order to ensure the adhesion of the TFT to the base substrate 9, a bonding layer 11a is required on the surface of the base substrate 9. The bonding layer 11a may be a thermal bonding material, such as, epoxy resin. The bonding layer (which is also referred to as "the first bonding layer") 11a may cover the electrical signal lead 10 and the base substrate 9;

A3, transferring the TFT 7 onto the bonding layer 11a, by using a micro transfer process;

when transferring the TFT 7 onto the bonding layer 11a, a micro-transfer protective layer (which may be referred to as "a first micro-transfer protective layer") 6a is also transferred to the base substrate 9;

A4, electrically connecting the electrical signal lead 10 with the TFT 7;

after configuring the TFT 7 in a suitable position of the base substrate 9 by using a micro-transfer stamp 5, an electrical connection between the electrical signal lead 10 and the TFT 7 is achieved, by making a via hole for the bonding layer 11a and the micro-transfer protective layer 6a; in which the first conductive connecting line 12 passes through the via hole, and respectively connects with the electrical signal lead 10 and the source of the TFT 7;

A5, preparing a bonding layer 11b on the base substrate 9; the bonding layer (which is also referred to as "a second bonding layer") 11b may be a thermal bonding material, such as, epoxy resin; the bonding layer 11b may cover the first conductive connecting line 12 and the micro-transfer protective layer 6a;

A6, making a via hole penetrating the bonding layer 11b, and preparing a second conductive connecting line 13 in the via hole;

in order to implement the electrical connection between the TFT 7 and the PIN 8, a via hole is made on the bonding layer 11b to lead the drain of the TFT 7, and a second conductive connection line 13 is fabricated in the via hole to realize the electrical connection to the PIN 8;

A7, transferring the PIN 8 onto the bonding layer 11b, by using a micro transfer process;

when transferring the PIN 8 onto the bonding layer 11b, a micro-transfer protective layer (which may be referred to as "a second micro-transfer protective layer") 6b is also transferred onto the base substrate 9; an electrode of the PIN 8 connects with the drain of the TFT 7 through the second conductive connection line.

After performing the foregoing blocks, a photoelectric sensor with TFT and PIN configured in a stacked structure, as shown in FIG. 6, may be fabricated. In the configuration scheme of stack structure about TFT and PIN, the aperture ratio of the photoelectric sensor can be increased to 100%, and the excellent performance of the silicon-based device is utilized to compensate for the poor performance of the glass process device.

In addition, in other embodiments, the second conductive connection line 13 and the first conductive connection line 12 may be formed simultaneously, and then, the second conductive connection line 13 is exposed, when fabricating the via hole penetrating the bonding layer 116.

Furthermore, in another specific embodiment, the fabricating method includes: fabricating a TFT array and a PIN array on a silicon substrate, in which the TFT array electrically connects with the PIN array; stripping the fabricated TFT array and PIN array from the silicon substrate, by using a micro transfer process, placing the TFT array and the PIN array on the base substrate formed with the electrical signal lead; and, electrically connecting the TFT array and the electrical signal lead.

In the embodiment, the TFT array and the PIN array arranged in the same layer may be fabricated on the silicon substrate, and then, the fabricated TFT array and PIN array are stripped from the silicon substrate, and transferred onto the base substrate formed with the electrical signal lead. In the silicon-based process, the TFT and the PIN possess good device performances, which may solve the problems of poor switching performance of TFT and poor photoelectric characteristics of PIN.

Furthermore, before stripping the fabricated TFT array and PIN array from the silicon substrate by using the micro transfer process, placing the TFT array and PIN array on the base substrate formed with the electrical signal lead, the method further includes:

preparing a bonding layer on the base substrate formed with the electrical signal lead;

in which stripping the fabricated TFT array and PIN array from the silicon substrate by using the micro transfer process, placing the TFT array and PIN array on the base substrate formed with the electrical signal lead, include:

adsorbing the TFT array and PIN array stripped from the silicon substrate, by using a micro-transfer stamp;

contacting the TFT array and PIN array adsorbed by the micro-transfer stamp with the bonding layer, such that the TFT array and PIN array are adhered to the bonding layer, the TFT array and PIN array are transferred onto the base substrate by using the adhesion of the bonding layer.

Figure 8:
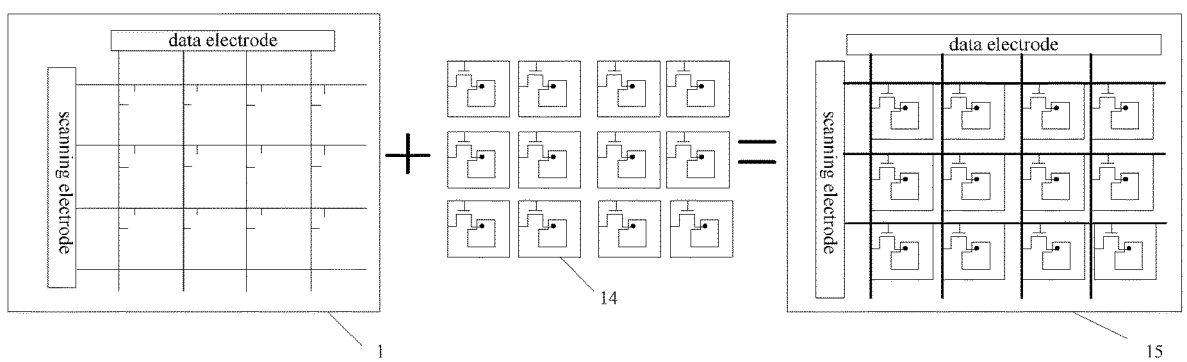
FIG. 8 is a schematic diagram illustrating how to produce a photoelectric sensor, in accordance with another specific embodiment of the application.

FIG. 8 is a flowchart illustrating how to fabricate a photoelectric sensor, in accordance with a specific embodiment of the application. In the embodiment, before performing the micro transfer, an electrical signal lead is prepared on the surface of the glass substrate 1, by using a glass substrate related process. On the silicon substrate of the micro-transfer process, a TFT, a PIN or a pixel modulation circuit is prepared by a silicon-based fabrication process, and then the TFT and the PIN are stripped from the wafer surface by means of a micro-transfer stamp. The reference numeral 14 in FIG. 8 indicates a micro-transfer stamp carrying the TFT array and the PIN array. Subsequently, the TFT and PIN are placed in a suitable position on the surface of the glass substrate 1, and the photoelectric sensor 15 is obtained.

Figure 9:
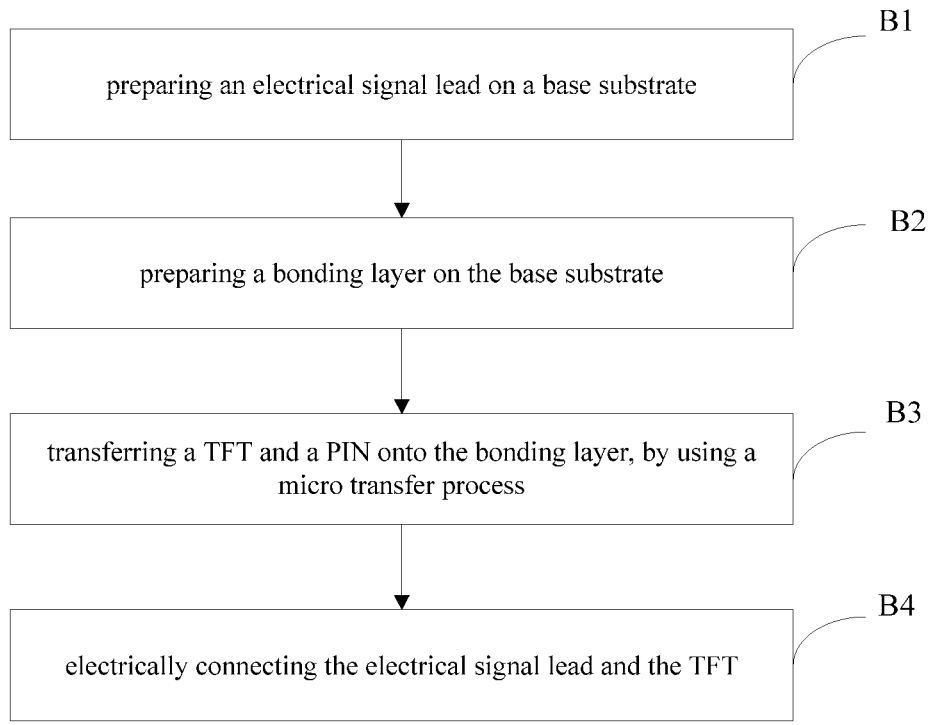
FIG. 9 is a flowchart illustrating how to produce a photoelectric sensor, in accordance with still another specific embodiment of the application.

As shown in FIG. 9, in the embodiment, a method for fabricating a photoelectric sensor includes:

B1, preparing an electrical signal lead on a base substrate;

B2, preparing a bonding layer on the base substrate;

transferring a TFT and a PIN onto the surface of the base substrate, in order to guarantee the adhesion of the TFT and PIN to the base substrate, a bonding layer on the surface of the base substrate is required, the bonding layer may be a thermal bonding material, such as epoxy resin;

B3, transferring the TFT and PIN onto the bonding layer, by using a micro transfer process;

when transferring the TFT and PIN onto the bonding layer, a micro-transfer protective layer is also transferred to the base substrate; when preparing the TFT and PIN on the silicon substrate, the TFT has been connected with the PIN;

B4, electrically connecting the electrical signal lead and the TFT;

after configuring the TFT and PIN in a suitable position on the base substrate by using a micro-transfer stamp, an electrical connection between the electrical signal lead and the TFT is realized, after making a via hole for the bonding layer and the micro-transfer protective layer.

In the embodiment, although the aperture ratio of the photoelectric sensor cannot be increased to 100%, in the silicon-based process, the TFT and PIN possess good device performance, which may solve the problems of poor switching performance of glass-substrate-fabricated TFT and poor photoelectric properties of glass-substrate-fabricated PIN.

Furthermore, in another specific embodiment, the fabricating method includes: fabricating a TFT array and a PIN array on a silicon substrate, in which the TFT array electrically connects the PIN array; stripping the fabricated TFT array and PIN array from the silicon substrate, by using the micro transfer process, placing the TFT array and PIN array on the base substrate; preparing the electrical signal lead on an array substrate formed with the TFT array and PIN array; and, electrically connecting the TFT array and the electrical signal lead.

In the embodiment, the TFT array and the PIN array arranged in the same layer may be fabricated on the silicon substrate, the fabricated TFT array and PIN array are stripped from the silicon substrate, and transferred onto the base substrate, and then the electrical signal lead is formed. In the silicon-based process, the TFT and PIN possess good device performance, which may solve the problems of poor switching performance of glass-substrate-fabricated TFT and poor photoelectric properties of glass-substrate-fabricated PIN.

Furthermore, before stripping the fabricated TFT array and PIN array from the silicon substrate by using the micro transfer process, placing the TFT array and the PIN array on the base substrate, the method further includes: preparing a bonding layer on the base substrate.

The stripping the fabricated TFT array and PIN array from the silicon substrate by using the micro transfer process, placing the TFT array and the PIN array on the base substrate include: adsorbing the TFT array and the PIN array stripped from the silicon substrate, by using a micro-transfer stamp; contacting the TFT array and the PIN array adsorbed on the micro-transfer stamp with the bonding layer, such that the TFT array and the PIN array are adhered to the bonding layer, the TFT array and the PIN array are transferred onto the base substrate, by using the adhesion of the bonding layer.

Figure 10:
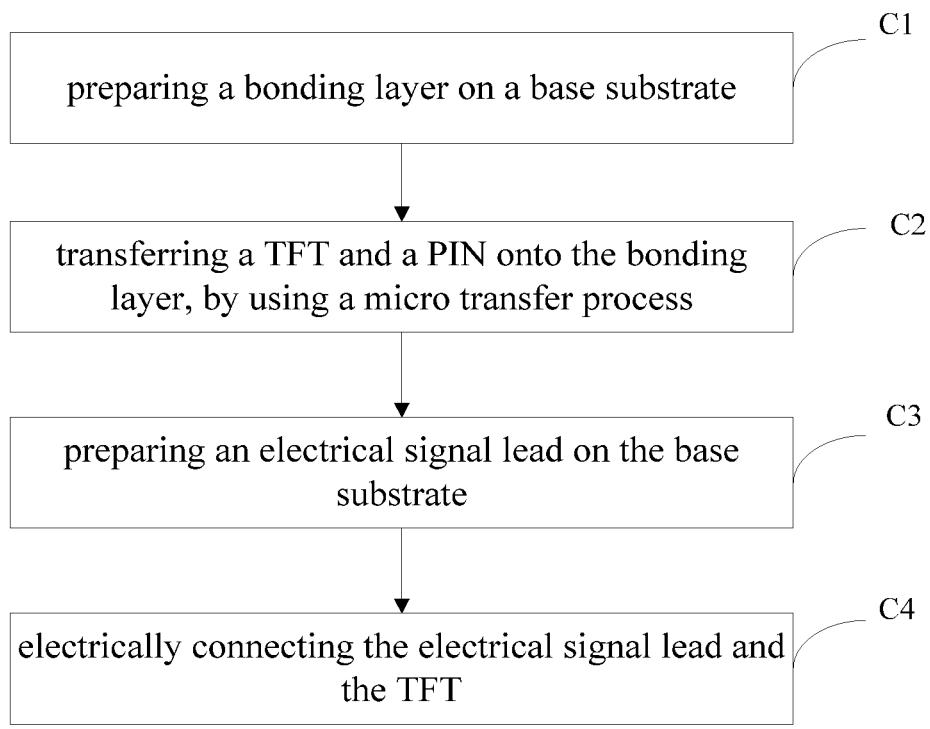
FIG. 10 is a flowchart illustrating how to produce a photoelectric sensor, in accordance with a specific embodiment of the application.

As shown in FIG. 10, in the embodiment, a method for fabricating a photoelectric sensor includes:

C1, preparing a bonding layer on a base substrate;

before transferring a TFT and a PIN onto the surface of the base substrate, in order to guarantee the adhesion of the TFT and the PIN to the base substrate, a bonding layer is required on the surface of the base substrate, the bonding layer may be a thermal bonding material such as an epoxy resin;

C2, transferring the TFT and PIN onto the bonding layer, by using a micro transfer process;

when transferring the TFT and the PIN onto the bonding layer, a micro-transfer protective layer is also transferred onto the base substrate; when preparing the TFT and the PIN on the silicon substrate, the TFT has been electrically connected with the PIN;

C3, preparing an electrical signal lead on the base substrate;

C4, electrically connecting the electrical signal lead and the TFT.

After configuring the TFT and the PIN in a suitable position of the base substrate by using the micro-transfer stamp, an electrical connection between the electrical signal lead and the TFT is realized, after making a via hole for the bonding layer and the micro-transfer protective layer.

An embodiment of the application also provides a photoelectric sensor, which is obtained, by using foregoing fabricating method.

In a specific embodiment, as shown in FIG. 6, the photoelectric sensor includes: a base substrate 9; an electrical signal lead 10 on the base substrate; a first bonding layer 11a; a TFT array 7 on the bonding layer, in which the TFT array is electrically connected to the electrical signal lead through a via hole penetrating the first bonding layer; a second bonding layer 11b; and, a PIN array 8 on the second bonding layer, in which the PIN array is electrically connected to the TFT array through a via hole penetrating the second bonding layer, an orthographic projection of the PIN array on the base substrate overlaps with an orthographic projection of the TFT array on the base substrate.

Optionally, the orthographic projection of the TFT array on the base substrate falls within the orthographic projection of the PIN array on the base substrate, such that the aperture ratio of the photoelectric sensor is reached 100%, and the resolution of the photoelectric sensor is significantly improved.

Figure 11:
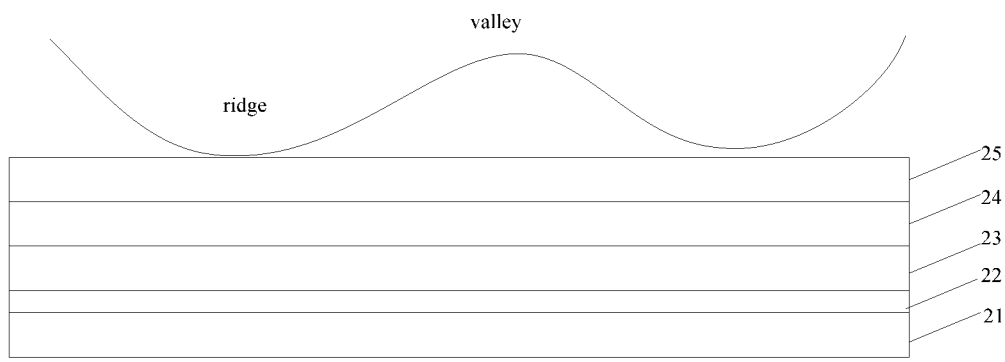
FIG. 11 is a schematic diagram illustrating a structure of a display device, in accordance with an embodiment of the application.

An embodiment of the application also provides a display device. As shown in FIG. 11, the display device includes a stacked display screen 24, and a photoelectric sensor as described above. The photoelectric sensor is located on a non-display side of the display screen 24. The display screen 24 includes a light transmission hole with a diameter less than a preset value. The photoelectric sensor includes a base substrate 21, a sensor array 22 on the base substrate 21. An encapsulation layer 23 is arranged between the display screen 24 and the photoelectric sensor. And a protective layer 25 is further disposed on the display screen 24.

If the photoelectric sensor is configured within the display screen, thickness of the display screen will be significantly increased, by using a prism concentrating imaging. Therefore, in this embodiment, the photoelectric sensor is disposed outside the display screen, and a small hole scheme is adopted to realize concentrating imaging. If the diameter of the light transmission hole is larger, the concentrating imaging cannot be realized. Thus, the diameter of the light transmission hole needs to be less than a preset value (also referred to as a first value). Specifically, the diameter of the light transmission hole is less than 10 um, and the diameter of the light transmission hole can be designed to be 1 to 10 um.

Figure 12:
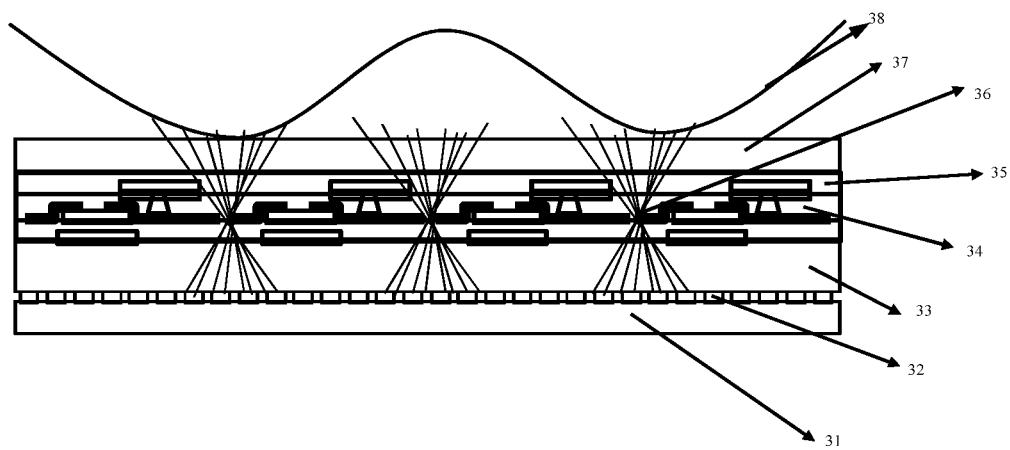
FIG. 12 is a schematic diagram illustrating a structure of a display device, in accordance with a specific embodiment of the application.

Specifically, as shown in FIG. 12, the display device includes a base substrate 31, a photoelectric sensor 32 on the base substrate 31, an encapsulation layer 33, a display backplane 34, a light-emitting layer 35, and a cover plate 37. The light-transmitting hole 36 may be a gap between TFTs on an array substrate of the display screen. The light-transmitting hole 36 and the TFT of the display screen are arranged in the same layer. The gap between TFT circuits is utilized to realize a small hole. Of course, a small hole at an appropriate position may be made separately. Taking a fingerprint recognition imaging as an example, according to the principle of small hole imaging, the reflected or projected light of fingerprint 38 can pass through the small hole to illuminate the photoelectric sensor, which is under the display screen, for imaging.

Figure 13:
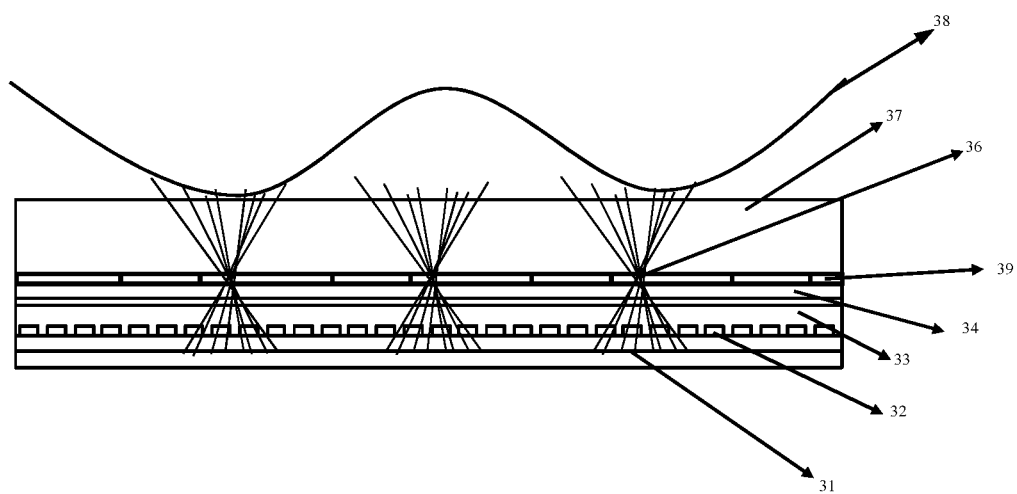
FIG. 13 is a schematic diagram illustrating a structure of a display device, in accordance with another specific embodiment of the application.

Furthermore, as shown in FIG. 13, the display device includes a base substrate 31, a photoelectric sensor array 32 on the base substrate, an encapsulation layer 33, a display backplane 34, a color film layer 39, and a cover plate 37. The light-transmitting hole 36 may be arranged on a black matrix between the color film layers 39 of the display screen. When fabricating a color film substrate, suitably arranged small holes are disposed on the black matrix. Taking fingerprint recognition imaging as an example, according to the principle of small hole imaging, the reflected or projected light of the fingerprint 38 can pass through the small hole to illuminate the photoelectric sensor, which is under the display screen, for imaging.

The display device may be any product or component that possesses a display function, such as, a TV, a display, a digital photo frame, a mobile phone, a tablet. The display device further includes a flexible circuit board, a printed circuit board, and a backboard.

In each method embodiment of the application, sequence numbers of the blocks are not used to limit the sequence of the blocks. For those skilled in the art, the sequential changes of the blocks are also within the protection scope of the application without any creative work.

Unless otherwise defined, technical terms or scientific terms used in the application are intended to be understood in the ordinary meaning of the ordinary skill of the art. The words "first", "second" and similar terms used in the application do not denote any order, quantity, or importance, but are used to distinguish different components. The words "including", "includes" or the like mean that, an element or item preceding the word is intended to cover the element, or item, or equivalents thereof, which is listed after the word, instead of excluding other elements or items. The words "connect" or "connected" and the like are not limited to physical or mechanical connections, but may include electrical connections, whether direct or indirect. "Upper", "lower", "left", "right", etc. are only used to indicate the relative positional relationship, and when the absolute position of the described object is changed, the relative positional relationship may also be changed accordingly.

It will be understood that, when a first element such as a layer, a film, a region or a substrate is referred to as being "on top of" or "under" a second element, the first element may be "directly" "on top of" or "under" the second element, or there may be an intermediate component.

The foregoing is optional implementation modes of the application. It should be pointed out that, for persons having ordinary skill in the art, several improvements and adaptions may be made without departing from the principle of the application, and such improvements and adaptions should also be covered by the protection scope of the application.

What is claimed is:

1. A method for fabricating a photoelectric sensor, comprising:
fabricating a thin film transistor (TFT) array and a photodiode array on a silicon substrate;
transferring the TFT array onto a base substrate by a micro transfer process; and
placing the photodiode array on the base substrate formed with the TFT array, in a manner that an orthographic projection of the photodiode array on the base substrate overlaps with an orthographic projection of the TFT array on the base substrate.

2. The method according to claim 1, wherein fabricating the TFT array and the photodiode array on the silicon substrate comprises:
fabricating the TFT array on a first silicon substrate and fabricating the photodiode array on a second silicon substrate;
wherein transferring the TFT array on the base substrate by the micro transfer process comprises:
stripping the TFT array from the first silicon substrate, by the micro transfer process; placing the TFT array on the base substrate formed with an electrical signal lead; and, electrically connecting the TFT array and the electrical signal lead;
wherein placing the photodiode array on the base substrate formed with the TFT array, in a manner that the orthographic projection of the photodiode array on the base substrate overlaps with the orthographic projection of the TFT array on the base substrate comprise:
stripping the photodiode array from the second silicon substrate, placing the photodiode array on the base substrate formed with the TFT array, in a manner that the orthographic projection of the photodiode array on the base substrate overlaps with the orthographic projection of the TFT array on the base substrate, and electrically connecting the TFT array and the photodiode array.

3. The method according to claim 2, wherein electrically connecting the TFT array and the electrical signal lead, and electrically connecting the TFT array and the photodiode array comprise:
after placing the TFT array on the base substrate formed with the electrical signal lead, forming a first via hole exposing the electrical signal lead, a second via hole exposing a source of the TFT array, and a third via hole exposing a drain of the TFT array;
forming a first conductive connection line, which connects the source and the electrical signal lead through the first via hole and the second via hole, and forming a second conductive connection line, which connects to the drain through the third via hole;
after placing the photodiode array on the base substrate formed with the TFT array, contacting an electrode of the photodiode array with the second conductive connection line.

4. The method according to claim 2, further comprising:
before stripping the TFT array from the first silicon substrate by the micro transfer process, and placing the TFT array on the base substrate formed with the electrical signal lead, preparing a first bonding layer on the base substrate formed with the electrical signal lead;
wherein stripping the TFT array from the first silicon substrate by the micro transfer process, and placing the TFT array on the base substrate formed with the electrical signal lead comprise:
adsorbing the TFT array stripped from the first silicon substrate, by using a micro- transfer stamp;
contacting the TFT array adsorbed on the micro-transfer stamp with the first bonding layer, such that the TFT array is adhered to the first bonding layer.

5. The method according to claim 4, further comprising:
before stripping the photodiode array from the second silicon substrate by the micro transfer process, and placing the photodiode array on the base substrate formed with the TFT array, in a manner that the orthographic projection of the photodiode array on the base substrate overlaps with the orthographic projection of the TFT array on the base substrate, preparing a second bonding layer on the base substrate formed with the TFT array;
wherein stripping the photodiode array from the second silicon substrate by the micro transfer process, and placing the photodiode array on the base substrate formed with the TFT array, in a manner that the orthographic projection of the photodiode array on the base substrate overlaps with the orthographic projection of the TFT array on the base substrate comprise:
adsorbing the photodiode array stripped from the second silicon substrate, by using a micro-transfer stamp; and,
contacting the photodiode array adsorbed on the micro-transfer stamp with the second bonding layer, in a manner that the orthographic projection of the photodiode array on the base substrate overlaps with the orthographic projection of the TFT array on the base substrate, such that the photodiode array is adhered to the second bonding layer.

6. The method according to claim 1, wherein transferring the TFT array onto the base substrate by the micro transfer process comprises:
transferring the TFT array onto a glass base substrate by the micro transfer process.

7. A photoelectric sensor, comprising:
a base substrate;
an electrical signal lead on the base substrate;
a first bonding layer;
a thin film transistor (TFT) array on the first bonding layer, wherein the TFT array electrically connects the electrical signal lead through a via hole penetrating the first bonding layer;
a second bonding layer;
a photodiode array on the second bonding layer, wherein the photodiode array electrically connects the TFT array through a via hole penetrating the second bonding layer, an orthographic projection of the photodiode array on the base substrate overlaps with an orthographic projection of the TFT array on the base substrate.

8. The photoelectric sensor according to claim 7, wherein the orthographic projection of the TFT array on the base substrate falls within the orthographic projection of the photodiode array on the base substrate.

9. The photoelectric sensor according to claim 7, wherein the base substrate is a glass base substrate.

10. The photoelectric sensor according to claim 7, wherein the first bonding layer covers the electrical signal lead and the base substrate.

11. The photoelectric sensor according to claim 7, further comprising a first micro-transfer protective layer, wherein the second bonding layer covers the first micro-transfer protective layer.

12. The photoelectric sensor according to claim 7, further comprising a second micro-transfer protective layer, which covers the photodiode array.

13. A display device, comprising a stacked display screen, and a photoelectric sensor according to claim 7, wherein the photoelectric sensor is located on a non-display side of the display screen, and the display screen comprises a light transmission hole with a diameter less than a first value.

14. The display device according to claim 13, wherein the light transmission hole is a gap between TFTs on an array base substrate of the display screen; or, the light transmission hole is arranged in a black matrix of a color film substrate of the display screen.

15. The display device according to claim 13, wherein the first value is 10 um.

16. The photoelectric sensor according to claim 7, wherein the second bonding layer is spaced from the first bonding layer.

* * * * *